(12) United States Patent
Dikshit et al.

(10) Patent No.: US 11,552,824 B2
(45) Date of Patent: Jan. 10, 2023

(54) LABEL BASED POLICY ENFORCEMENT

(71) Applicant: HEWLETT PACKARD ENTERPRISE DEVELOPMENT LP, Houston, TX (US)

(72) Inventors: Saumya Dikshit, Bangalore (IN); Vinayak Joshi, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 15 days.

(21) Appl. No.: 17/391,790

(22) Filed: Aug. 2, 2021

(65) Prior Publication Data

US 2022/0345330 A1 Oct. 27, 2022

(30) Foreign Application Priority Data

Apr. 26, 2021 (IN) .............................. 202141019140

(51) Int. Cl.
*H04L 12/46* (2006.01)
*H04L 45/64* (2022.01)
*H04L 45/50* (2022.01)

(52) U.S. Cl.
CPC .......... *H04L 12/4641* (2013.01); *H04L 45/50* (2013.01); *H04L 45/64* (2013.01); *H04L 2212/00* (2013.01)

(58) Field of Classification Search
None
See application file for complete search history.

(56) References Cited

U.S. PATENT DOCUMENTS

2018/0069792 A1* 3/2018 Gao ........................ H04L 12/46

* cited by examiner

*Primary Examiner* — Christine T Duong
(74) *Attorney, Agent, or Firm* — Hewlett Packard Enterprise Patent Department (57) ABSTRACT

Examples disclosed herein relate to a method comprising receiving a data packet originating from a first device and intended for a second device, wherein the first device and the first access device belong to a first branch of a Wide Area Network (WAN) using a MPLS overlay and the second device belongs to a second branch of the WAN. The method includes encapsulating the data packet in VXLAN including a VXLAN label identifying a role type and transmitting the data packet to a first core device. The method includes determining an MPLS label corresponding to the role type and transmitting the data packet over the MPLS overlay to a second core device belonging to the second branch of the WAN. The method includes translating the MPLS label into the VXLAN label and transmitting the data packet including the VXLAN label to a second access device for an enforcement action.

20 Claims, 5 Drawing Sheets

LABEL BASED POLICY ENFORCEMENT

BACKGROUND

Multiprotocol Label Switching (MPLS) is a networking technique where data is directed from one node to the next based on short path labels instead of traditional network addresses. A label may be, for example, an identifier with some local significance.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Different kinds of wired & wireless enterprise devices (e.g. laptops, cell phones, printers, security cameras, IoT devices etc.) connect to Access Switches (wired) and Access Points (wireless) in an enterprise network. These two types of network modes form the edge of the network. Edge devices, in addition to supporting strong authentication methods (e.g. 802.1x), may use the authentication mechanism to dynamically group users into roles. For example, two devices connected to the same access switch (or even the same access port) can be grouped into to two different roles, based on their credentials—device 1 can be a guest and device 2 can be an employee. Transmitting network traffic according to user roles may be referred to as policy enforcement.

Network policies (e.g. "prohibit all traffic from guest role users to security camera role devices") are imposed in a network independent manner. That is, the devices across roles can belongs to different or same VLANs, subnets, VRFs etc. In other words, segmentation is enforced in a network entity (VLAN, subnet VRF etc. independent manner. Such segmentation can be divided into macro-segmentation and micro-segmentation. Macro-segmentation enforces network polices between virtual networks, such as different branches of a Wide Area Network (WAN). Micro-segmentation enforces network polices between different users and/or roles within the virtual network.

Policy enforcement may include micro-segmentation, where segmentation policies may have to be applied on the user groups that are on the same IP subnet whereas with macro-segmentation clients could be separated by subnets & Virtual Routing and Forwarding (VRF). Some deployments may use a distributed segmentation model which may. mandate deployment distributed macro/micro segmentation across campus networks over WAN/Campus Backbones. The systems and methods described herein describe a MPLS based distributed segmentation model. The model proposed is fully standards compliant and can be incorporated into the existing deployments without disturbing the existing configurations.

In one example, a guest and an admin are on different IP subnets but they are across two different branches. Traffic between them can be simply prevented (macro-segmentation) using a simple ACL rule which drops all traffic originating from the subnet. The rule can be configured on an access device of the first branch or the second branch. However, this is highly inconvenient and unmanageable because subnet configuration changes in every branched have to be propagated across multiple branches to be translated as subnet ACL rule. In a second example, a centralized solution may be used for policy enforcement. In this example, all traffic has to be forwarded through a centralized controller. However, such a solution can lead to throughput issues and may not be easily extended across branches and campuses.

The systems and methods described herein use MPLS for distributed macro and micro-segmentation. In one example, a network architecture includes two VxLAN campus fabrics and a data center fabric connected by a WAN Back-bone. The WAN/Back-bone MPLS network extends to campus cores and data center gateway. Hence, the VPN/VRF labels are exchanged between campus cores and MPLS transport labels are exchanged within the PE/P routers (i.e. service provider routers.).

A method for using labels in a virtualized switch environment may include receiving, by a first access device, a data packet originating from a first device and intended for a second device, wherein the first device and the first access device belong to a first branch of a Wide Area Network (WAN) using a MPLS overlay and the second device belongs to a second branch of the WAN. The method may include encapsulating, by the first access device, the data packet in VXLAN including a VXLAN label identifying a role type of the first device and the second device and transmitting, by the first access device, the data packet to a first core device, wherein the first core device belongs to the first branch of the WAN. The method may also include determining, by the first core device, an MPLS label corresponding to the role type and transmitting, by the first core device, the data packet over the MPLS overlay to a second core device belonging to the second branch of the WAN, the data packet including the MPLS label. The method may also include translating, by the second core device, the MPLS label into the VXLAN label and transmitting, by the second core device, the data packet including the VXLAN label to a second access device for enforcement of the role type, the second access device belonging to the second branch.

Figure 1:
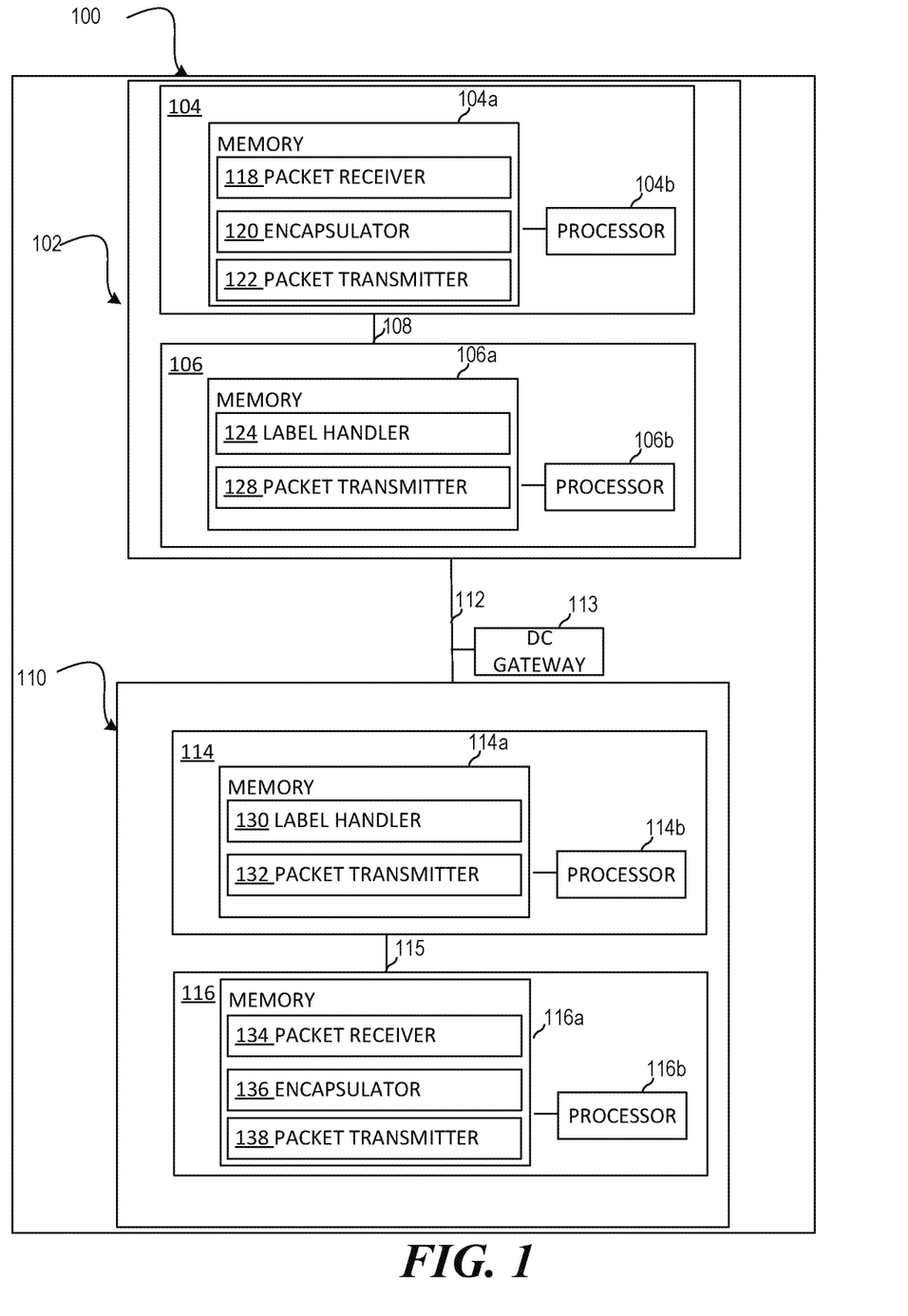
FIG. 1 is a block diagram of an example system for label based policy enforcement.

FIG. 1 is a block diagram of an example system 100 where label based policy enforcement may be useful. The system 100 may include a first network branch 102 including a first access device 104 and a first core device 106 connected by an overlay 108. The first access device 104 may be located at an access layer of the network and may be used for connecting the majority of devices to the network. For example devices such as computers, phones, Internet of things devices, etc. may be connected to a network via an access switch. Additionally, there may be a user role associated with different devices, different types of devices, different users, different locations, etc. The role may define what type of traffic the device is able to send/receive as well as what others device/user/roles that traffic may be sent to. For example, a user role associated with a laptop device may not be able to send data to a administrator device.

The first core device 106 may be a data switch that connects to the backbone or physical core of a network. First core device 106 may be a high-capacity switch that serve as the gateway to a wide area network (WAN) or the Internet.

The first network branch 102 may employ one or more overlays 108, such as a VXLAN overlay tunnel Mesh, to connect devices on the network, such as first core device 106 and first access device 104. Other example overlays include MPLS or Network Virtualization using Generic Routing Encapsulation (NVGME).

The first network branch 102 may be connected, via first core device 106, to a second network branch 110 via a WAN 112. The WAN 112 may be the backbone of the entire network and may use an MPLS deployment. The WAN may cover a number of network branches, including first network branch 102 and second network branch 110 as well as one or more data centers. The WAN 112 may be connected to the data center via a data center gateway 113.

The second network branch 110 may include a second access device 114 and a second core device 116. The second access device 114 may be similar to the first access device 104 described above. Similarly, the second core device 116 may be similar to the first core device 106 described above.

The second network branch 110 may employ one or more overlays 115, such as a VXLAN overlay tunnel Mesh, to connect devices on the network, such as second core device 116 and second access device 114.

In an example, a user device on the first network branch 102 may attempt to send network traffic to an admin device on the second network branch 110. The user device may connect to the first access device 104 and transmit one or more data packets to the first access device 104. First access device 104 may encapsulate the packet in VxLAN and place a VXLAN tag in the VxLAN GPO/GPE bits. The VxLAN tag may correspond to a role associated with the device transmitting the data packets. More, although VxLAN is used as the example overlay mechanism in the example, the systems and methods described herein could be used with other communication technologies that are used to connect devices on a network branch.

The first access device 104 may transmit the encapsulated data packet over the VxLAN overlay to the first core device 106. The first core device 106 may receive the VxLAN data packet from the first access device 104, either directly or indirectly, and decapsulate the packet. The first core device 106 may then place an MPLS label corresponding to the VxLAN tag onto the data packet. The first core device 106 may send the data packet, including the MPLS label to the second core device 116 of the second network branch 110 via the WAN 112. Importantly, additional labels, such as a VPN and/or VRF label may also be transmitted from the first core device 106 to the second core device 116. These additional labels may be carried all the way to the second core device 116 and thus the tag label may be placed at the bottom of the label stack.

The second core device 116 may receive the data packet and pop the MPLS label off of the bottom of the stack. The second core device 116 may further translate the MPLS label into a VxLAN tag and place the tag value onto the VxLAN header with GPO/GPE bits. The second core device 116 may forward the data packet with the VxLAN tag to the second access device 114 over the VxLAN overlay. The second access device 114 may receive the data packet and decapsulate the header to identify the VxLAN tag. The second access device may determine a role associated with the VXLAN tag and enforce that role. In the example above, a user device on the first network branch 102 attempt to send network traffic to an admin device on the second network branch 110. The second access device 114 may determine, based on a policy, that the user is unable to send data packets to the admin device and accordingly, the second access device 116 may drop the packet.

First access device 104 may include a memory 104a and a processor 104b that may be coupled to each other through a communication link (e.g., a bus).

First core device 106 may include a memory 106a and a processor 106b that may be coupled to each other through a communication link (e.g., a bus).

Second access device 114 may include a memory 114a and a processor 114b that may be coupled to each other through a communication link (e.g., a bus).

Second core device 116 may include a memory 116a and a processor 116b that may be coupled to each other through a communication link (e.g., a bus).

Processors 104b, 106b, 114b and 116b may include a single or multiple Central Processing Units (CPU), microprocessor, Application Specific Integrated Circuit (ASIC) and/or other hardware devices suitable for retrieval and execution of instructions stored in machine-readable storage medium. In some examples, memory 104a, 106a, 114a and 116a stores machine readable instructions executed by respective processor 104b, 106b, 114b and 116b for first access device 104, first core device 106, second access device 114 and second core device 116, respectively. Memory 104a, 106a, 114a and 116a may include any suitable combination of volatile and/or non-volatile memory, such as combinations of Random Access Memory (RAM), Read-Only Memory (ROM), flash memory, and/or other suitable memory.

Memory 104a stores instructions to be executed by processor 104b including instructions for packet receiver 118, encapsulator 120, packet transmitter 122 and/or other components. According to various implementations, first access device 104 may be implemented in hardware and/or a combination of hardware and programming that configures hardware.

Memory 106a stores instructions to be executed by processor 106b including instructions for label handler 124, packet transmitter 128 and/or other components. According to various implementations, first core device 106 may be implemented in hardware and/or a combination of hardware and programming that configures hardware.

Memory 114a stores instructions to be executed by processor 114b including instructions for label handler 130, packet transmitter 132 and/or other components. According to various implementations, second access device 114 may be implemented in hardware and/or a combination of hardware and programming that configures hardware.

Memory 116a stores instructions to be executed by processor 114b including instructions for packet receiver 134, encapsulator 136, packet transmitter 138 and/or other components. According to various implementations, second core device 116 may be implemented in hardware and/or a combination of hardware and programming that configures hardware.

Processor 104*b* of first access device 104 may execute packet receiver 118 to receive a data packet originating from a first device and intended for a second device. As described above, the first device and the first access device may belong to a first branch of a Wide Area Network (WAN) using a MPLS overlay and the second device may belong to a second branch of the WAN. Processor 104*b* of first access device 104 may execute encapsulator 120 to encapsulate the data packet in VXLAN including a VXLAN label identifying a role type of the first device and the second device. Processor 104*b* of first access device 104 may execute packet transmitter 122 to transmit the data packet to a first core device, wherein the first core device belongs to the first branch of the WAN.

Processor 106*b* of first core device 106 may execute label handler 124 to determine an MPLS label corresponding to the role type. Processor 106*b* of first core device 106 may execute packet transmitter 128 to transmit the data packet over the MPLS overlay to a second core device belonging to the second branch of the WAN, the data packet including the MPLS label.

Processor 116*b* of second core device 116 may execute label handler 130 to translate the MPLS label into the VXLAN label. Processor 116*b* of second core device 116 may execute packet transmitter 132 to transmit the data packet including the VXLAN label to a second access device for enforcement of the role type, the second access device belonging to the second branch.

Processor 114*b* of second access device 114 may execute packet receiver 134 to receive the data packet from the second core device 116. Processor 114*b* of second access device 114 may execute encapsulator 136 to decapsulate the data packet to identify the VxLAN tag. Processor 114*b* of second access device 114 may execute role enforcer 138 to enforce the role corresponding to an identification in the VxLAN tag. Enforcing the policy may include for example, dropping a packet, transmitting a packet and/or other network activity.

Figure 2:
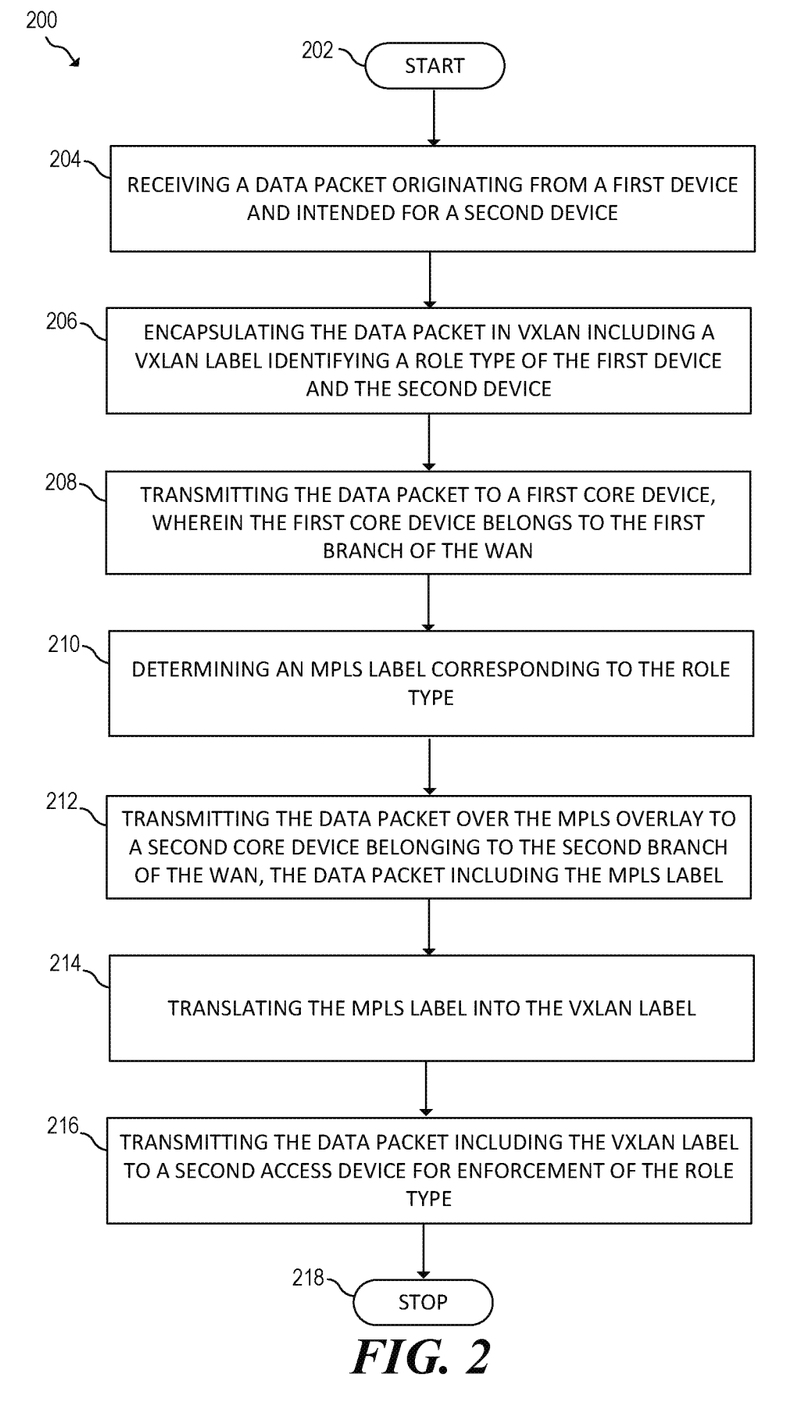
FIG. 2 is a flow diagram of an example method for label based policy enforcement.

FIG. 2 is a flow diagram of a method 200 for label based policy enforcement. The system where method 200 is performed may be similar to system 100 described above. Accordingly, parts of and/or the entire method may be performed by one or more of the devices belonging to system 100.

The method 200 may begin at block 202 and proceed to block 204, where the method may include receiving, by a first access device, a data packet originating from a first device and intended for a second device. The first device and the first access device may belong to a first branch of a Wide Area Network (WAN) using a MPLS overlay and the second device may belong to a second branch of the WAN. The first device and the second device may be on different IP subnets. The method may proceed to block 206, where the method may include encapsulating, by the first access device, the data packet in VXLAN including a VXLAN label identifying a role type of the first device and the second device. The method may proceed to block 208, where the method may include transmitting, by the first access device, the data packet to a first core device, wherein the first core device belongs to the first branch of the WAN. The method may proceed to block 210, where the method may include determining, by the first core device, an MPLS label corresponding to the role type.

In some aspects, the method may also include decapsulating, by the first core device, the data packet in VXLAN and placing, by the first core device, an MPLS label corresponding to the VXLAN tag on the packet. The MPLS label may be placed on a predetermined location of a label stack on the data packet In some aspects, the method may also include removing, by the first core device, VXLAN information including the VXLAN label from the data packet. The method may proceed to block 212, where the method may include transmitting, by the first core device, the data packet over the MPLS overlay to a second core device belonging to the second branch of the WAN, the data packet including the MPLS label.

The method may proceed to block 214, where the method may include translating, by the second core device, the MPLS label into the VXLAN label. The method may proceed to block 216, where the method may include transmitting, by the second core device, the data packet including the VXLAN label to a second access device for enforcement of the role type, the second access device belonging to the second branch. The enforcement action may include, for example, discarding a packet intended for the second device and the role type of the first device may not have permission to transmit data packets to the role type of the second device.

The first core device and the first access device may be connected via a first VXLAN overlay tunnel mesh on the first branch of the WAN and the second core device and the second access device may be connected via a second VXLAN overlay tunnel mesh on the second branch.

The method may proceed to block 218, where the method may end.

Figure 3:
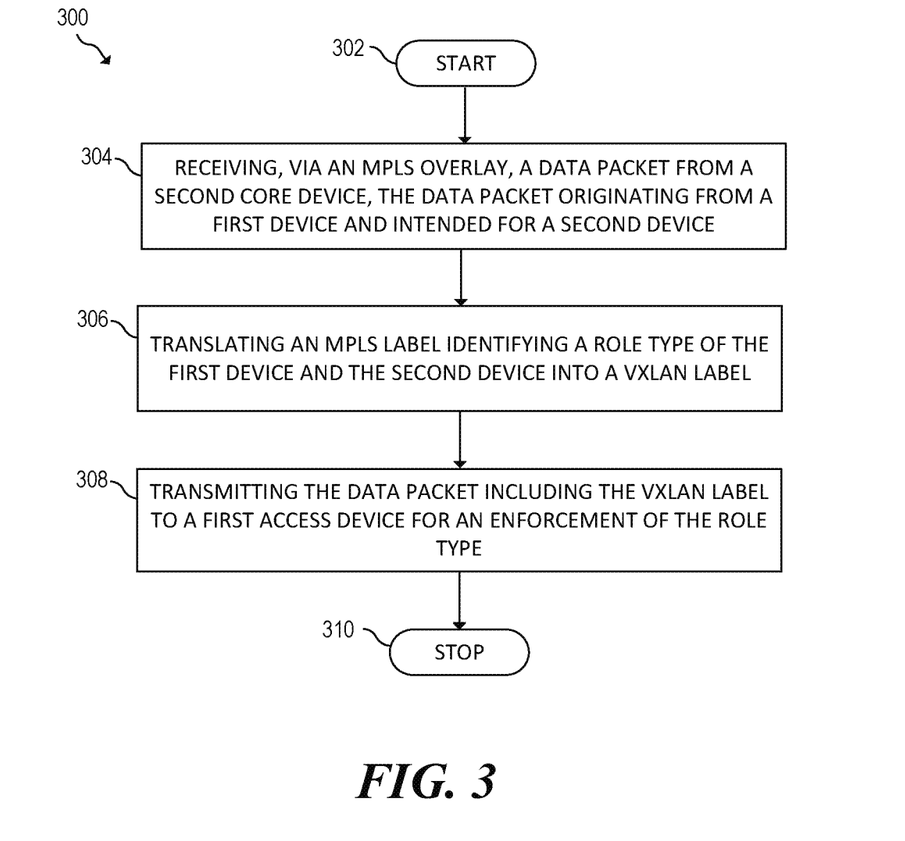
FIG. 3 is a block diagram of another example method for label based policy enforcement.

FIG. 3 is a flow diagram of a method 300 for label based policy enforcement. The system where method 300 is performed may be similar to system 100 described above. Accordingly, parts of and/or the entire method may be performed by one or more of the devices belonging to system 100. For example, method 300 may be performed by first core device 106.

The method 300 may begin at block 302 and proceed to block 304, where the method may include receiving, via an MPLS overlay, at a first core device, a data packet from a second core device, the data packet originating from a first device and intended for a second device. The first device and the first core device may belong to a first branch of a Wide Area Network (WAN) using a MPLS overlay and the second device and the second core device belong to a second branch of the WAN.

The method may proceed to block 306, where the method may include translating, by the first core device, an MPLS label identifying a role type of the first device and the second device into a VXLAN label, the MPLS label added to the data backet by the second core device.

The method may proceed to block 308, where the method may include transmitting, by the first core device, the data packet including the VXLAN label to a first access device for an enforcement action of the role type, the first access device belonging to the first branch. The method may proceed to block 314, where the method may end.

The first core device and the first access device may be connected via a first VXLAN overlay tunnel mesh on the first branch of the WAN and the second core device and a second access device may be connected via a second VXLAN overlay tunnel mesh on the second branch. The enforcement action may be, for example, discarding a packet intended for the second device and the role type of the first device may not have permission to transmit data packets to the role type of the second device. The first device and the second device may be on different IP subnets. The MPLS label may be placed on a predetermined location of a label stack on the data packet. The VXLAN information including the VXLAN label from the data packet may have been removed by the second core device.

Figure 4:
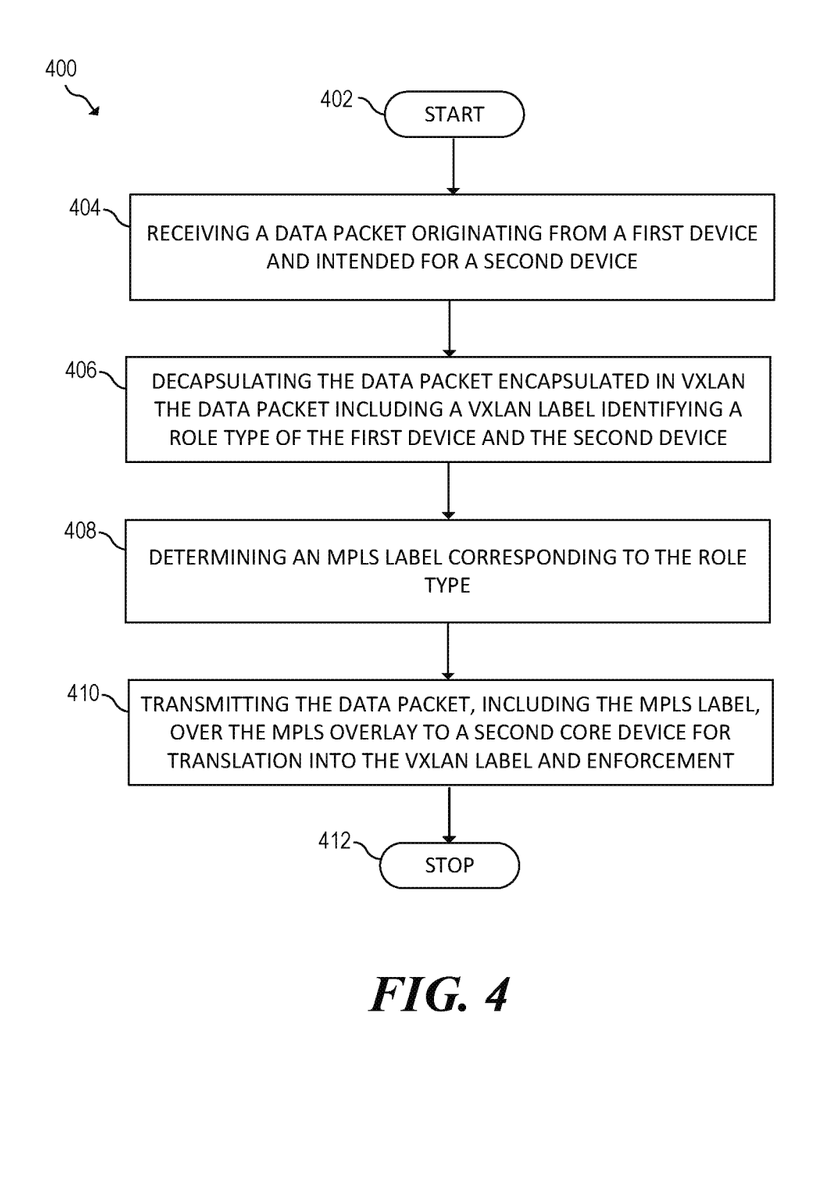
FIG. 4 is a block diagram of another example method for label based policy enforcement.

FIG. 4 is a flow diagram of a method 400 for label based policy enforcement. The system where method 400 is performed may be similar to system 100 described above. Accordingly, parts of and/or the entire method may be performed by one or more of the devices belonging to system 100. For example, method 400 may be performed by second core device 116.

Method 400 may start at block 402 and continue to block 404, where the method 400 may include receiving, by a first core device, a data packet originating from a first device and intended for a second device. The first device and the first core device may belong to a first branch of a Wide Area Network (WAN) using a MPLS overlay and the second device may belong to a second branch of the WAN. The method may proceed to block 406, where the method may include decapsulating, by the first core device, the data packet encapsulated in VXLAN by a first access device, the data packet including a VXLAN label identifying a role type of the first device and the second device. The first access device may belong to the first branch of the WAN.

The method may proceed to block 408, where the method may include determining, by the first core device, an MPLS label corresponding to the role type. In some aspects, the method may also include decapsulating, by the first core device, the VXLAN and places an MPLS label corresponding to the VXLAN tag on the packet. The method may also include removing, by the first core device, VXLAN information including the VXLAN label from the data packet.

The method may proceed to block 410, where the method may include transmitting, by the first core device, the data packet, including the MPLS label, over the MPLS overlay to a second core device for translation into the VXLAN label and enforcement of the role type. The second core device may belong to the second branch of the WAN. The method may proceed to block 418, where the method may end.

The first core device and the second access device may be connected via a first VXLAN overlay tunnel mesh on the first branch of the WAN and the second core device and the second access device may be connected via a second VXLAN overlay tunnel mesh on the second branch. The enforcement action may include discarding a packet intended for the second device and the role type of the first device may not have permission to transmit data packets to the role type of the second device. The first device and the second device may be on different IP subnets. The MPLS label may be placed on a predetermined location of a label stack on the data packet.

Figure 5:
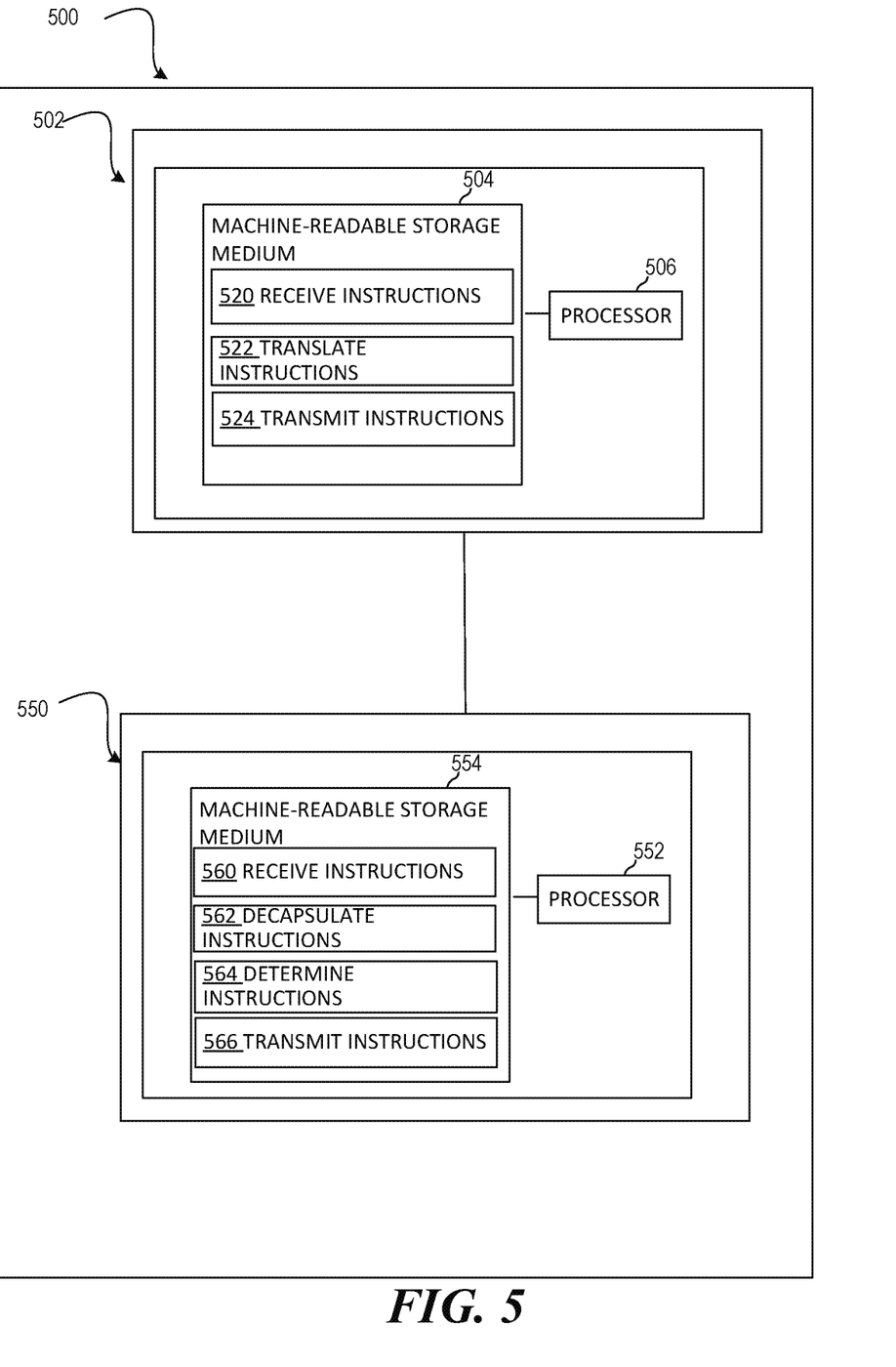
FIG. 5 is a block diagram of an example system for label based policy enforcement.

FIG. 5 is a block diagram of an example system 500 for label based policy enforcement. In the example illustrated in FIG. 5, system 500 includes a first core device 502 with a processor 506 and a machine-readable storage medium 504 and an second core device 550 with a processor 552 and a machine-readable storage medium 554. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 506 may be at least one central processing unit (CPU), microprocessor, Application Specific Integrated Circuit (ASIC) and/or other hardware devices suitable for retrieval and execution of instructions stored in machine-readable storage medium 504. In the example illustrated in FIG. 5, processor 506 may fetch, decode, and execute instructions 520, 522 and 524. Processor 506 may include at least one electronic circuit comprising a number of electronic components for performing the functionality of at least one of the instructions in machine-readable storage medium 504. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 504 may be any electronic, magnetic, optical, or other physical storage device that stores executable instructions. Thus, machine-readable storage medium 504 may be, for example, Random Access Memory (RAM), an Electrically-Erasable Programmable Read-Only Memory (EEPROM), a storage drive, an optical disc, and the like. Machine-readable storage medium 504 may be disposed within system 500, as shown in FIG. 5. In this situation, the executable instructions may be "installed" on the system 500. Machine-readable storage medium 504 may be a portable, external or remote storage medium, for example, that allows system 500 to download the instructions from the portable/external/remote storage medium. In this situation, the executable instructions may be part of an "installation package". As described herein, machine-readable storage medium 504 may be encoded with executable instructions for context aware data backup. The machine-readable storage medium may be non-transitory.

Referring to FIG. 5, message transmit instructions 520, when executed by a processor (e.g., 506), may cause system 500 to receive, via an MPLS overlay, at a first core device, a data packet from a second core device, the data packet originating from a first device and intended for a second device, wherein the first device and the first core device belong to a first branch of a Wide Area Network (WAN) using a MPLS overlay and the second device and the second core device belong to a second branch of the WAN.

Receive instructions 522, when executed by a processor (e.g., 506), may cause system 500 to receive, via an MPLS overlay, at a first core device, a data packet from a second core device, the data packet originating from a first device and intended for a second device. The first device and the first core device may belong to a first branch of a Wide Area Network (WAN) using a MPLS overlay and the second device and the second core device may belong to a second branch of the WAN.

Translate instructions 524, when executed by a processor (e.g., 506), may cause system 500 to translate, by the first core device, an MPLS label identifying a role type of the first device and the second device into a VXLAN label, the MPLS label added to the data backet by the second core device. Transmit instructions 524, when executed by a processor (e.g., 506), may cause system 500 to transmit, by the first core device, the data packet including the VXLAN label to a first access device for an enforcement action of the role type. The first access device may belong to the first branch.

System 500 may also include a second core device 550 with a processor 552 and a machine-readable storage medium 554. Processor 552 may be at least one central processing unit (CPU), microprocessor, Application Specific Integrated Circuit (ASIC) and/or other hardware devices suitable for retrieval and execution of instructions stored in machine-readable storage medium 554. In the example illustrated in FIG. 5, processor 552 may fetch, decode, and execute instructions 560, 562, 564 and 566. Processor 552 may include at least one electronic circuit comprising a number of electronic components for performing the functionality of at least one of the instructions in machine-readable storage medium 554. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 554 may be any electronic, magnetic, optical, or other physical storage device that stores executable instructions. Thus, machine-readable storage medium 554 may be, for example, Random Access Memory (RAM), an Electrically-Erasable Programmable Read-Only Memory (EEPROM), a storage drive, an optical disc, and the like. Machine-readable storage medium 504 may be disposed within system 500, as shown in FIG. 5. In this situation, the executable instructions may be "installed" on the system 500. Machine-readable storage medium 504 may be a portable, external or remote storage medium, for example, that allows system 500 to download the instructions from the portable/external/remote storage medium. In this situation, the executable instructions may be part of an "installation package". As described herein, machine-readable storage medium 554 may be encoded with executable instructions for context aware data backup. The machine-readable storage medium may be non-transitory.

Referring to FIG. 5, receive instructions 560, when executed by a processor (e.g., 552), may cause system 500 to receive, by a first core device, a data packet originating from a first device and intended for a second device. The first device and the first core device may belong to a first branch of a Wide Area Network (WAN) using a MPLS overlay and the second device may belong to a second branch of the WAN.

Referring to FIG. 5, decapsulate instructions 562, when executed by a processor (e.g., 552), may cause system 500 to decapsulate, by the first core device, the data packet encapsulated in VXLAN by a first access device, the data packet including a VXLAN label identifying a role type of the first device and the second device. The first access device may belong to the first branch of the WAN.

Referring to FIG. 5, determine instructions 564, when executed by a processor (e.g., 552), may cause system 500 to determine, by the first core device, an MPLS label corresponding to the role type.

Referring to FIG. 5, transmit instructions 566, when executed by a processor (e.g., 552), may cause system 500 to transmit, by the first core device, the data packet, including the MPLS label, over the MPLS overlay to a second core device for translation into the VXLAN label and enforcement of the role type. The second core device may belong to the second branch of the WAN.

The foregoing disclosure describes a number of examples for label based policy enforcement. The disclosed examples may include systems, devices, computer-readable storage media, and methods for label based policy enforcement. For purposes of explanation, certain examples are described with reference to the components illustrated in FIGS. 1-5. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method comprising:
   receiving, by a first access device, a data packet originating from a first device and intended for a second device, wherein the first device and the first access device belong to a first branch of a Wide Area Network (WAN) using a MPLS overlay and the second device belongs to a second branch of the WAN;
   encapsulating, by the first access device, the data packet in VXLAN including a VXLAN label identifying a role type of the first device and the second device;
   transmitting, by the first access device, the data packet to a first core device, wherein the first core device belongs to the first branch of the WAN;
   determining, by the first core device, an MPLS label corresponding to the role type;
   transmitting, by the first core device, the data packet over the MPLS overlay to a second core device belonging to the second branch of the WAN, the data packet including the MPLS label;
   translating, by the second core device, the MPLS label into the VXLAN label; and
   transmitting, by the second core device, the data packet including the VXLAN label to a second access device for an enforcement action of the role type, the second access device belonging to the second branch.

2. The method of claim 1 wherein the first core device and the first access device are connected via a first VXLAN overlay tunnel mesh on the first branch of the WAN and the second core device and the second access device are connected via a second VXLAN overlay tunnel mesh on the second branch.

3. The method of claim 1 comprising:
   removing, by the first core device, VXLAN information including the VXLAN label from the data packet.

4. The method of claim 1 wherein the enforcement action is discarding a packet intended for the second device and the role type of the first device does not have permission to transmit data packets to the role type of the second device.

5. The method of claim 1 comprising:
   decapsulating, by the first core device, the data packet in VXLAN and
   placing, by the first core device, an MPLS label corresponding to the VXLAN tag on the packet.

6. The method of claim 1 wherein the first device and the second device are on different IP subnets.

7. The method of claim 1 wherein the MPLS label is placed on a predetermined location of a label stack on the data packet.

8. A system comprising:
   a packet receiver to receive, via an MPLS overlay, at a first core device, a data packet from a second core device, the data packet originating from a first device and intended for a second device, wherein the first device and the first core device belong to a first branch of a Wide Area Network (WAN) using a MPLS overlay and the second device and the second core device belong to a second branch of the WAN;

a label translator to translate, by the first core device, an MPLS label identifying a role type of the first device and the second device into a VXLAN label, the MPLS label added to the data backet by the second core device; and a packet transmitter to transmit, by the first core device, the data packet including the VXLAN label to a first access device for an enforcement action of the role type, the first access device belonging to the first branch.

9. The system of claim 8 wherein the first core device and the first access device are connected via a first VXLAN overlay tunnel mesh on the first branch of the WAN and the second core device and a second access device are connected via a second VXLAN overlay tunnel mesh on the second branch.

10. The system of claim 8 wherein the enforcement action is discarding a packet intended for the second device and the role type of the first device does not have permission to transmit data packets to the role type of the second device.

11. The system of claim 8 wherein the first device and the second device are on different IP subnets.

12. The system of claim 8 wherein the MPLS label is placed on a predetermined location of a label stack on the data packet.

13. The system of claim 8 wherein the VXLAN information including the VXLAN label from the data packet has been removed by the second core device.

14. A non-transitory machine-readable storage medium encoded with instructions, the instructions executable by a processor of a system to cause the system to:

receive, by a first core device, a data packet originating from a first device and intended for a second device, wherein the first device and the first core device belong to a first branch of a Wide Area Network (WAN) using a MPLS overlay and the second device belongs to a second branch of the WAN;

decapsulate, by the first core device, the data packet encapsulated in VXLAN by a first access device, the data packet including a VXLAN label identifying a role type of the first device and the second device, wherein the first access device belongs to the first branch of the WAN;

determine, by the first core device, an MPLS label corresponding to the role type and transmit, by the first core device, the data packet, including the MPLS label, over the MPLS overlay to a second core device for translation into the VXLAN label and enforcement of the role type, the second core device belonging to the second branch of the WAN.

15. The non-transitory machine-readable storage medium of claim 14 wherein the first core device and the second access device are connected via a first VXLAN overlay tunnel mesh on the first branch of the WAN and the second core device and the second access device are connected via a second VXLAN overlay tunnel mesh on the second branch.

16. The non-transitory machine-readable storage medium of claim 15, the instructions executable by a processor of a system to cause the system to:

remove, by the first core device, VXLAN information including the VXLAN label from the data packet.

17. The non-transitory machine-readable storage medium of claim 14 wherein the enforcement action is discarding a packet intended for the second device and the role type of the first device does not have permission to transmit data packets to the role type of the second device.

18. The non-transitory machine-readable storage medium of claim 15, the instructions executable by a processor of a system to cause the system to:

decapsulate, by the first core device, the VXLAN and places an MPLS label corresponding to the VXLAN tag on the packet.

19. The non-transitory machine-readable storage medium of claim 14 wherein the first device and the second device are on different IP subnets.

20. The non-transitory machine-readable storage medium of claim 14 wherein the MPLS label is placed on a predetermined location of a label stack on the data packet.

* * * * *